Inventors:
Harry S. Blanchard;
Herman L. Finkbeiner,
by
Their Agent.

3,259,629
COPPER CATALYST AND PROCESS OF MAKING
Harry S. Blanchard, Schenectady, and Herman L. Finkbeiner, Ballston Lake, N.Y., assignors to General Electric Company, a corporation of New York
Original application May 29, 1961, Ser. No. 113,364, now Patent No. 3,219,626, dated Nov. 23, 1965. Divided and this application Dec. 22, 1964, Ser. No. 428,004
10 Claims. (Cl. 260—270)

This application is a division of our application Serial No. 113,364, filed May 29, 1961.

This invention relates to new chemical compounds and to a method of their production. More specifically, this invention relates to a cupric complex having the empirical formula

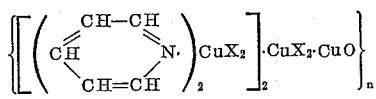

where X is selected from the group consisting of chlorine and bromine and $n$ is an integer and is at least 1 and to the method of preparation of these compounds.

In an application of Allan S. Hay, Serial No. 212,128, filed July 24, 1962, which is a continuation-in-part of both Serial No. 69,245 filed November 15, 1960, now abandoned, and Serial No. 744,086, filed July 24, 1958, now abandoned, all of which are assigned to the same assignee as the present invention, there is disclosed and claimed a method of oxidizing phenols in which the catalyst is a tertiary amine and a cuprous salt soluble in the tertiary amine and capable of existing in the cupric state. Pyridine is one of the tertiary amines which may be used. Cuprous bromide or cuprous chloride are two of the cuprous salts which may be used. We have now found that the brown crystalline cupric complexes having the empirical formula

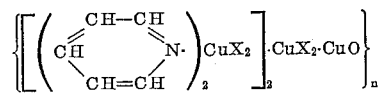

where X is selected from the group consisting of chlorine and bromine, and $n$ is an integer and is at least 1, are extremely active catalysts for the oxidation of phenols, either to phenylene ether polymers, also known as polyphenylene ethers and polyphenylene oxides, or to diphenoquinones.

Figure 1:
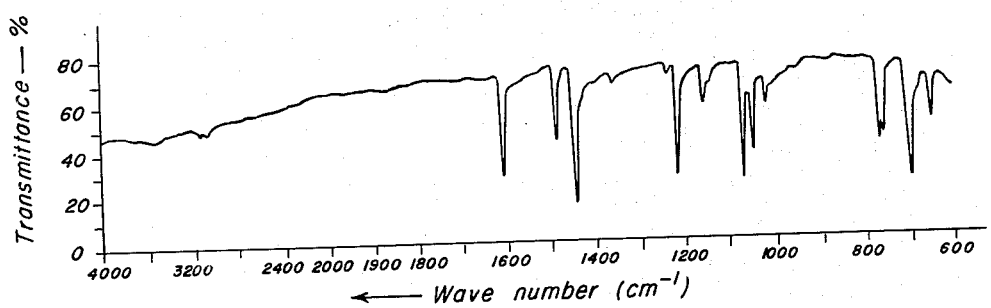
Figure 2:
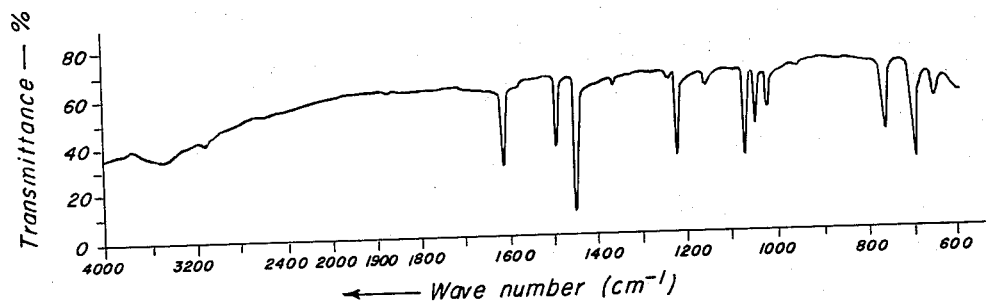

In order that those skilled in the art may better understand our invention, the following more detailed description is given, which should be read in conjunction with the attendant drawings, in which:

FIG. 1 is the infrared spectrum of our compound having the above empirical formula, wherein X is chlorine; and FIG. 2 is the infrared spectrum of our compound corresponding to the above empirical formula wherein X is bromine.

There are several alternative ways of producing the brown crystalline compounds of our invention. In a copending application of ours, Serial Number 425,955, filed concurrently herewith and assigned to the same assignee as the present invention, we have disclosed and claimed a green, crystalline cupric complex having the empirical formula

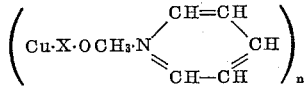

where X is selected from the group consisting of chlorine and bromine and $n$ is an integer and is at least 1. This green crystalline compound is readily prepared, for example, by reacting a cuprous salt selected from the group consisting of cuprous chloride and cuprous bromide dissolved in anhydrous methanol and reacted with oxygen in the presence of pyridine. The green crystalline cupric compound precipitates from the reaction mixture and is easily recovered by filtration. When this green crystalline compound is placed in methanol, it does not dissolve even when heated to the reflux temperature of the methanol. However, it does change from a green crystalline compound to the brown crystalline compound of this invention, which likewise is insoluble in methanol and can be easily isolated by filtration and dried in air.

The brown crystalline copper complex can be reconverted to the green crystalline copper complex by reaction of the former with an alkali metal alkoxide, e.g., sodium methylate, etc.

Another way to prepare our compound is to react oxygen with a solution of either cuprous chloride or cuprous bromide in isopropyl alcohol containing pyridine. This reaction can conveniently be carried out at ambient temperature up to the reflux temperature of the reaction mixture. The brown crystalline cupric ion complex precipitates from the reaction mixture from which it is conveniently filtered, washed and dried.

Our compound may also be prepared by making the pyridine complex of either cupric chloride or cupric bromide in which 2 moles of pyridine combine with 1 mole of the cupric halide. The complex is reacted with either cupric chloride or cupric bromide and with cupric hydroxide in the molar ratio of 2, 1 and 1, respectively. This gives a cupric complex in which the constituents are present in the ratio of 3 moles of cupric halide, 4 moles of pyridine and 1 mole of cupric hydroxide now present as the oxide. The reaction is carried out in a liquid which is inert to the reactants to facilitate heating. Suitable liquids are, for example, the liquid hydrocarbons, alcohols, ethers, etc. Specific examples are methyl alcohol, ethyl alcohol, dibutyl ether, petroleum ether, benzene, toluene, etc. The mixture is heated to reflux or approximately 5 to 10 minutes, by which time the desired brown crystalline compound which is insoluble has formed in the liquid phase. This is readily removed by filtration from the methanol and air dried. Another method is disclosed in Example 3.

When all of the halogen of the reactants is chlorine, the final product no matter which process is used, has the infrared spectrum shown in FIG. 1. When all of the halogen of the reactants is bromine, the final product no matter which process is used, has the infrared spectrum shown in FIG. 2. Table I shows the result obtained by elemental analysis of the compound containing chlorine, whose infrared spectrum is shown in FIG. 1.

TABLE I

| | Calculated for $\{[(C_6H_5N\cdot)_2CuCl_2]_2\cdot CuCl_2\cdot CuO\}_n$ | Found |
|---|---|---|
| C | 30.2 | 30.8 |
| H | 2.5 | 2.4 |
| N | 7.0 | 7.3 |
| Cu | 31.7 | 31.1 |
| Cl | 26.6 | 26.5 |
| O | 2.0 | 3.2 |

Such analysis confirms the empirical formula but does not define $n$. The numerical value to be assigned to $n$ can only be determined by determining the molecular weight. Unfortunately, such a determination depends on being able to dissolve the product in a solvent and so far we have been unable to find any solvent in which the brown crystalline complex is soluble, except under conditions in which it reacts to form a new compound. Because of the well known ability of copper in the divalent state to form four coordinate complexes, we believe that our compounds have one of the structures (A) or (B):

(A)

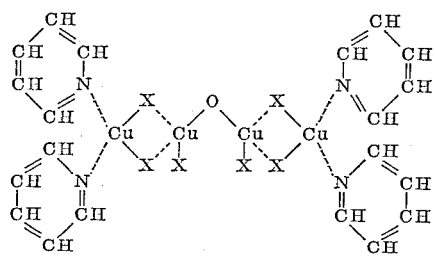

B)

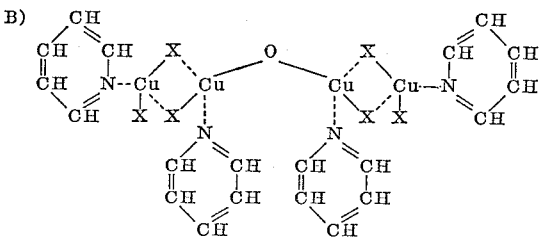

where in each case X is either chlorine or bromine. The fact that these compounds are crystalline indicates that the materials are of low molecular weight and therefore we believe that $n$ is most likely 1, but in any case probably does not exceed 6 or 8.

Surprisingly enough, these brown crystalline compounds cannot be prepared from such closely related materials as cupric iodide or cupric fluoride or alkyl substituted pyridines.

As disclosed and claimed in our copending application, Serial No. 113,364, filed May 29, 1961, now Patent No. 3,219,626, from which this application has been divided, our unique complexes may be used as catalysts for the oxidation of 2,6-disubstituted phenols for the preparation of either phenylene ether polymers or diphenoquinones according to the following schematic diagram:

Equation I

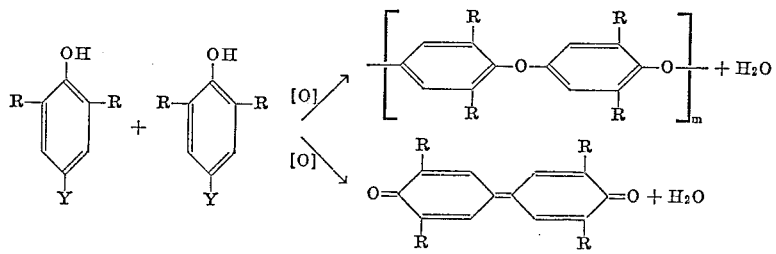

where $m$ is an integer having a value of at least 10, R is a monovalent substituent selected from the group consisting of hydrocarbon and halohydrocarbon having at least 2 carbon atoms and Y is a monovalent substituent selected from the group consisting of hydrogen, chlorine, bromine, and iodine.

In order that those skilled in the art may better understand our invention, the following examples are given which are illustrative of the practice of our invention and are not intended for purposes of limitation. In the examples, all parts are by weight, unless stated otherwise.

*Example 1*

The green crystalline, insoluble, cupric chloride pyridine complex was prepared according to the method disclosed in our copending application, Serial Number 425,955, for example, by stirring a reaction mixture containing 0.5 gram of cuprous chloride, 2 ml. of anhydrous pyridine, and 50 ml. anhydrous methanol in an atmosphere of oxygen for 16 hours, and filtering the green crystalline solid which precipitates from the reaction mixture. This compound was refluxed in methanol under nitrogen for 120 minutes, by which time the green crystalline compound which had never dissolved in the methanol was converted to the brown crystalline compound whose elemental analysis is shown in Table I, and whose infrared spectrum is shown in FIG. 1. The structural formula of this compound is believed to be illustrated by structures A or B, in which X is chlorine. Our brown crystalline compound was likewise produced by reacting a suspension of 1 gram (0.00239 mole) of the above green crystalline cupric complex in 25 ml. of 0.1 N (0.0025 mole of HCl) solution of hydrogen chloride in methanol. Within one to two minutes the green mixture turned tan and within 10 to 15 minutes the desired brown crystalline cupric complex had formed. After filtering from the reaction mixture, washing with methanol and air drying the material was found to have an infrared spectrum identical with that shown in FIG. 1.

*Example 2*

The brown crystalline copper complex prepared in Example 1 may be reconverted back to the green crystalline copper complex starting material as follows. 0.8 gram (0.001 mole) of the brown crystalline compound identical with that prepared in Example 1 was added to 25 ml. of methanol, along with 1 ml. of a 2 N (0.002 mole) of sodium methylate in methanol, and stirred for 1 hour at room temperature. During this time, the brown crystalline compound which did not dissolve became a green crystalline compound which was filtered from the reaction mixture and dried in air. Infrared analysis of this material showed it to be almost completely the green crystalline cupric complex used as the staring material in Example 1.

*Example 3*

A solution of 0.5 gram (0.0037 mole) of cupric chloride in 40 ml. of methanol was prepared under nitrogen and 0.0370 gram (0.0037 mole) of cuprous chloride, followed by 0.6 ml. (0.0074 mole) of pyridine, were added. As soon as the pyridine was added, a purple solid precipitated from the reaction mixture and was believed to have the structural formula of either of the two alternatives shown below.

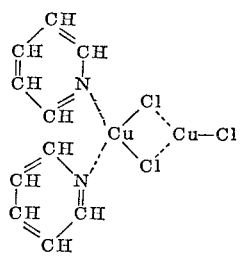

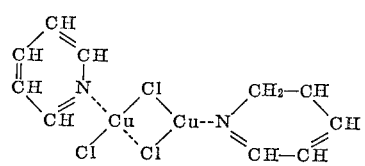

Oxygen was now bubbled through the reaction mixture which immediately turned the mixture green and a brown crystalline compound separated which after separation from the reaction mixture was found to have an infrared spectrum identical with that in FIG. 1.

As will be readily apparent to those skilled in the art, either the cupric chloride or the cuprous chloride in the above reaction may be replaced with the corresponding bromide so that the brown crystalline compound isolated from the reaction mixture would be a mixed chloride-bromide compound.

*Example 4*

The pyridine complex of cupric chloride was prepared by reacting 10 grams (0.126 mole) of pyridine with a solution of 6.75 grams (0.05 mole) of cupric chloride in 300 ml. methanol at room temperature. The complex which precipitated was filtered from the solution and dried. A suspension of 2.92 grams (0.01 mole) of the pyridine cupric chloride complex, 0.67 gram (0.005 mole) of cupric chloride and 0.5 gram (0.005 mole) of cupric hydroxide in about 60 ml. of methanol was refluxed for approximately 10 minutes by which time the solids had become a brown crystalline material. After separation from the reaction mixture and drying, the material was found to have an infrared spectrum identical with FIG. 1.

*Example 5*

The pyridine complex of cupric bromide was prepared by reacting 10 grams (0.126 mole) of pyridine with a solution of 11.2 grams (0.05 mole) of cupric bromide in 300 ml. of methanol at room temperature. The complex which precipitated was collected by filtration and dried.

A suspension of 3.8 grams (0.01 mole) of the pyridine-cupric bromide complex, 1.1 grams (0.005 mole) of cupric bromide and 0.5 gram (0.005 mole) of cupric hydroxide in 60 ml. of methanol was refluxed for approximately 10 minutes by which time the solids had become a reddish-brown crystalline material. After separation from the reaction mixture and drying, the material was found to have an infrared spectrum identical with FIG. 2.

Obviously, other modifications and variations of the present invention are possible in the light of the above teachings. It is, therefore, to be understood that changes may be made in the particular embodiments of the invention described which are within the full intended scope of the invention as defined by the appended claims.

What we claim as new and desire to secure by Letters Patent of the United States is:

1. A novel crystalline cupric complex having the empirical formula

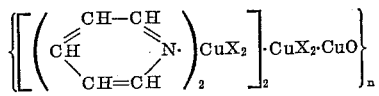

where X is selected from the group consisting of chlorine and bromine and $n$ is an integer and is at least 1.

2. The cupric complex of claim 1 where X is chlorine.
3. The cupric complex of claim 1 where X is bromine.
4. The method of making the novel crystalline cupric complex having the empirical formula

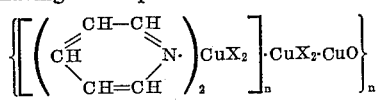

where X is selected from the group consisting of chlorine and bromine and $n$ is an integer and is at least 1, which comprises reacting a cupric salt selected from the group consisting of cupric chloride and cupric bromide with a cuprous salt selected from the group consisting of cuprous chloride and cuprous bromide in the ratio of 1 mole of the cupric salt to 1 mole of the cuprous salt with pyridine in the absence of oxygen in an anhydrous solution in methanol, thereafter reacting the mixture with oxygen and isolating the novel crystalline compound from the reaction mixture.

5. The method of claim 4 wherein the cuprous salt is cuprous chloride and the cupric salt is cupric chloride.
6. The method of making the novel cupric complex having the empirical formula

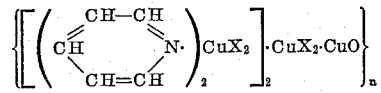

where X is selected from the group consisting of chlorine and bromine and $n$ is an integer and is at least 1, which comprises reacting a cupric halide selected from the group consisting of cupric chloride and cupric bromide in a liquid with pyridine and cupric hydroxide in the molar ratio of 3 moles of the cupric halide, 4 moles of pyridine and 1 mole of cupric hydroxide and isolating the novel crystalline solid from the reaction mixture.

7. The method of claim 6 wherein the cupric halide is cupric chloride.
8. The method of claim 6 wherein the cupric halide is cupric bromide.
9. The method of making the novel crystalline cupric complex having the empirical formula

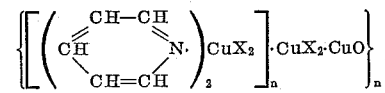

where X is selected from the group consisting of chlorine and bromine and $n$ is an integer and is at least 1, which comprises reacting a cuprous salt selected from the group consisting of cuprous chloride and cuprous bromide in an anhydrous solution in methanol with oxygen in the presence of pyridine to precipitate a crystalline compound which is thereafter heated in the presence of methanol to produce the desired novel crystalline compound, and thereafter removing the crystalline compound from the reaction mixture.

10. The method of claim 9 wherein the cuprous salt is cuprous chloride.

References Cited by the Examiner

Kinoshita: Bul. Chem. Soc., Japan, vol. 32, pp. 777–80 (1959).

Tarent'ev, Chem. Abst., vol. 50, 4807c (1956).

HENRY R. JILES, *Acting Primary Examiner.*

DONALD G. DAUS, *Assistant Examiner.*